Patented Mar. 28, 1944

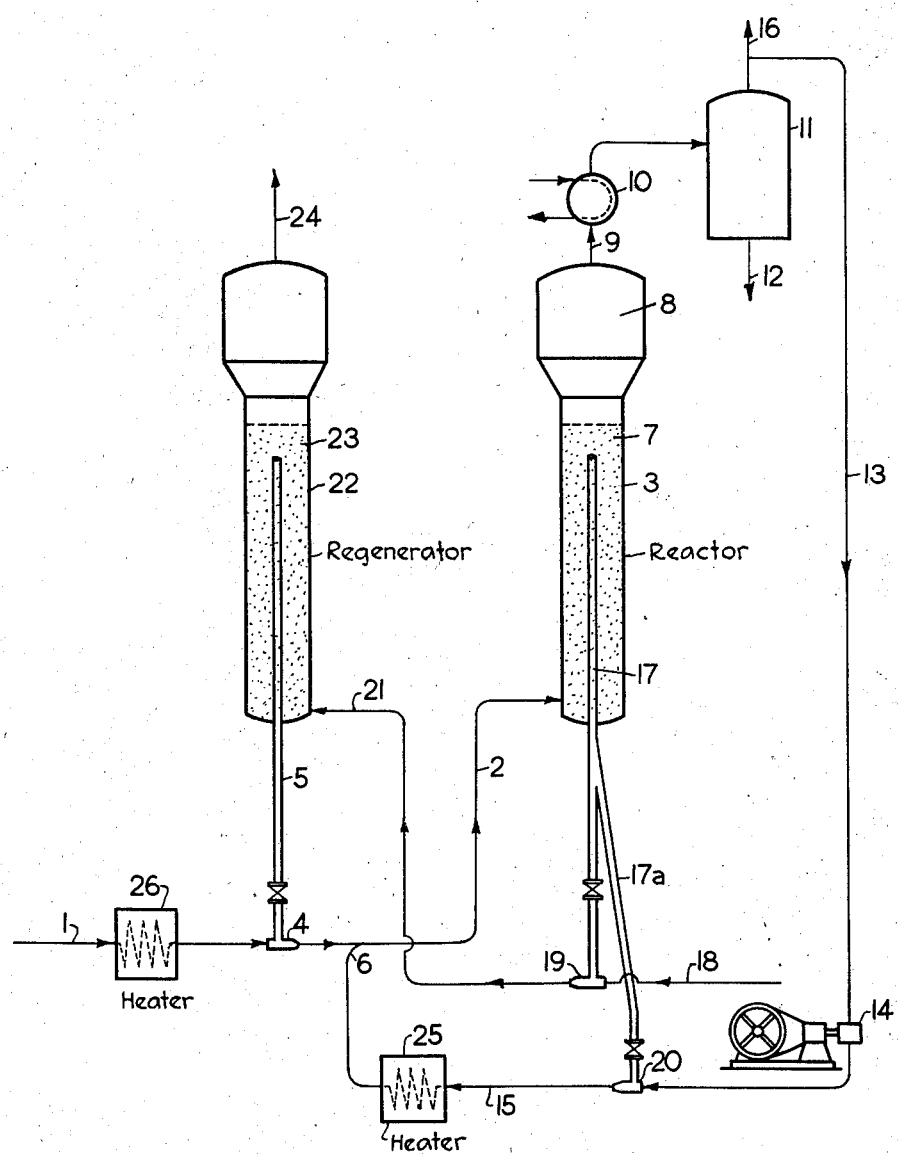

2,345,487

UNITED STATES PATENT OFFICE 2,345,487

METHOD FOR EFFECTING CATALYTIC CONVERSIONS

George E. Liedholm, Scarsdale, N. Y., assignor to Shell Development Company, San Francisco, Calif., a corporation of Delaware Application March 9, 1942, Serial No. 433,845

4 Claims. (Cl. 196—52)

This invention relates to an improved method for the execution of endothermic conversions of organic materials in the vapor phase with finely divided solid regenerative catalysts.

More particularly, the invention relates to an improved method for effecting endothermic hydrocarbon conversions. A particular aspect of the invention relates to a method of treating petroleum fractions under incipient cracking conditions with clay-type catalysts.

Numerous processes have been proposed for the execution of various conversions with the aid of finely divided solid catalysts. Many of these proposed processes are applicable for certain reactions such, in particular, as exothermic inorganic reactions, but in the majority of cases they are not practical or even suitable for the execution of organic conversions, especially when they are endothermic. More recently a novel method has been developed which is both suitable and practical for large scale conversion of organic materials. In this method the catalyst in the form of a finely divided powder or dust is carried with the vapors to be treated into the lower portion of a vertical column of the catalyst under reaction conditions. The catalyst in the reaction zone is aerated by the rising vapors and appears and acts like boiling liquid. In fact, it is often referred to as the "fluid catalyst." The vaporous reaction products are separated from the catalyst in an upper zone, usually integral with the reaction zone, and the vapors are withdrawn. Partially spent catalyst from the reaction zone is continuously withdrawn and cycled through a separate regeneration zone. The heat required to maintain the desired temperature in the reaction zone, i. e., in the column of catalyst, is supplied primarily by the vapors and catalyst entering therein. The vapors to be reacted are, in general, preheated to about the reaction temperature. The remainder of the required heat is usually supplied by the finely divided catalyst which, in turn, is heated by the heat of combustion of carbonaceous deposits in the regeneration zone. One of the novel features in these proposed processes is the withdrawal of the partially spent catalyst from the reaction zone through a long standpipe which acts as a vapor seal, thus materially simplifying the method of feeding a controlled amount of catalyst. The catalyst withdrawn from the reaction zone is carried by a stream of regeneration gas to a separate regeneration zone which, in general, operates in principle exactly like the reaction zone. Regenerated catalyst from the regeneration zone is withdrawn and carried to the reaction zone with the incoming feed.

This process, while it is considered to be suitable, practical and superior in many respects to fixed bed operation, has certain disadvantages. One of these disadvantages is the difficulty in establishing and maintaining the desired temperature in the reaction zone. This condition is especially aggravated when the catalytic conversion is highly endothermic. Another disadvantage is that, in general, it is necessary to recirculate a substantial part of the freshly regenerated catalyst back through the regeneration zone to adsorb some of the heat of regeneration and act as a temperature-controlling medium. Also, in order to avoid large concentrations of carbon on the catalyst and to supply the necessary heat to the reaction zone, it is generally necessary to recycle large amounts of catalyst from the reaction zone to the regeneration zone, even though the withdrawn catalyst is not completely spent. As described in my joint patent with Benjamin Merrill Holt, No. 2,325,516, dated July 27, 1943, this method of operation does not utilize the maximum activity of dehydrogenating-type catalysts. This is due to the fact that catalysts of this type exhibit an appreciable induction period before reaching maximum activity. Furthermore, the large amount of catalyst continuously passed through the regeneration zone carries with it appreciable quantities of adsorbed organic products from the reaction zone which burn in the regeneration zone and supply additional heat which must be removed by one means or another.

The object of the present invention is to provide an improved process of the above-described general type wherein these disadvantages are largely eliminated.

The process of the present invention differs from the known method described in that the partially spent catalyst withdrawn from the reaction zone is split into two portions, only one of which is regenerated. The other portion is recirculated by means of gaseous reaction products to the incoming feed-catalyst mixture entering the conversion chamber. This recirculated mixture of partially spent catalyst and product gases is heated in a suitable indirect heating means to supply the necessary heat to the reaction zone. By this method of operation the above-described disadvantages are substantially eliminated. Thus, the catalyst, when it is of the dehydrogenating type, is used at approximately maximum activity. Only a small amount of catalyst is continuously passed through the regenerating zone. Consequently, only a small amount of reactants and/or reaction products are burned in the regeneration zone.

The invention may be conveniently described in connection with an operation within its scope. To assist in this description the attached diagrammatic drawing has been provided which shows by means of conventional figures, not drawn to scale, an arrangement of elements in which the process may be conducted.

Referring to the drawing, the material to be converted, entering via pipe 1, is passed through a preheater 26 wherein it is vaporized and heated to the desired temperature (usually about the reaction temperature) and then via pipe 2 to the lower portion of the reaction chamber 3. At 4 freshly regenerated catalyst from standpipe 5 is introduced into the stream of reactant vapors passing to the reaction zone. At 6 a mixture of partly spent catalyst and product gases is introduced into the mixture of reactant vapors and freshly regenerated catalyst. The mixture of freshly regenerated catalyst and partially spent catalyst suspended in the mixture of reactant vapors and product gases entering the reaction zone via line 2 passes upwardly through the column of finely divided catalyst 7 maintained under reaction conditions. The vapors passing upwardly through the finely divided catalyst aerate it and cause it to "boil." The vaporous products leaving the column of finely divided catalyst pass to a zone of relatively large diameter wherein the gas velocity is relatively low. In this zone 8 particles of finely divided catalyst separate from the gaseous products and fall to the column of catalyst 7. The vaporous products leave the reaction chamber via pipe 9, pass through a cooler 10, and thence to a flash drum 11 wherein they are separated into gaseous and liquid portions. The liquid portion is withdrawn via line 12. The gaseous portion is withdrawn via line 13 and pumped via compressor 14 and line 15 back to the feed line 2. Excess gas may be removed via line 16. Partially spent catalyst from the reaction zone is continuously withdrawn via standpipe 17. This standpipe is preferably of such length that when filled with the finely divided catalyst there is a negligible tendency for the gases from either line 15 or line 18 to pass back into the reaction zone. As shown, the partially spent catalyst withdrawn from the reaction zone is divided into two portions. Thus, one portion to be regenerated is withdrawn from the standpipe at 19 whereas another portion to be recycled is withdrawn from a branch of standpipe 17 at 20. The portion of partially spent catalyst withdrawn at 19 to be regenerated is carried via a stream of regeneration gas such as air via line 21 to a regenerator 22 entering near the bottom. The regenerator operates in principle like the above-described reactor, the catalyst being regenerated being disposed in a vertical column 23. Spent regeneration gas is removed from the regeneration zone via line 24. The freshly regenerated catalyst is withdrawn via a similar standpipe 5 and enters the stream of vapors to be treated, as above described. The portion of partially spent catalyst withdrawn from the reaction zone via line 17a is carried with the stream of product gases in line 15 through a suitable heater 25, and thence back to the reaction zone via line 2. The heating means 25 and 26 may be of any conventional design such as coils mounted in a furnace, coils immersed in a molten salt bath, or the like.

While I have in the above described the process of the invention with particular reference to the assembly of apparatus illustrated in simplified form in the attached drawing, it is to be understood that the process of the invention is not limited to the particular design of the several pieces of the apparatus shown nor to the flow indicated except for the principles set forth in the above description and that all such modifications of process flow and plant design which utilize said principles are to be considered within the spirit of the invention. Thus, instead of the partially spent catalyst being withdrawn from the reaction zone via one standpipe with a branch 17a, separate standpipes may be provided for each of the two portions of catalyst. Also, the method by which the regeneration is effected may be altered to suit the circumstances. Thus, for example, a portion of the regenerated catalyst withdrawn via 5 may be cooled and recycled through the regeneration zone in the conventional manner by suitable means (not shown). Furthermore, the reactors may be equipped with other or additional means for separating the finely divided catalyst from the vaporous reaction products. Also, various means may be utilized to economize heat, for example by heat exchange between the incoming feed and the spent regeneration gas or the reaction products, or both. Furthermore, it is immaterial in which order the regenerated catalyst and the partially spent catalyst are introduced into the feed in line 2.

The present process is suitable for use in effecting a wide variety of conversions, particularly endothermic conversions of organic materials. Thus, it is very suitable for the vapor phase treatment of hydrocarbons, for example in the cracking, desulfurization, catalytic reforming, etc., of petroleum products. The process is especially advantageous, however, in the treatment of petroleum fractions under incipient cracking conditions with catalysts of the clay type. Such processes are commonly called isoforming. In isoforming processes, cracking in the usual sense is secondary and may in many cases be entirely absent. The primary reactions in isoforming involve rearrangements of the various hydrocarbon molecules. Thus, in the case of the treatment of highly olefinic fractions such as thermally cracked gasoline fractions, considerable isomerization of the olefines takes place. In such cases where the hydrocarbon fraction treated contains, in addition to substantial quantities of olefines, a substantial quantity of naphthenic hydrocarbons, one of the predominant reactions is hydrogen transfer to form paraffinic and aromatic hydrocarbons. These processes which are used to improve petroleum fractions of low value are endothermic.

The present process may be applied with many regenerative finely divided or dust catalysts. By a regenerative catalyst is meant a catalyst which may be periodically regenerated by the combustion of carbonaceous deposits therefrom. Thus, the process of the invention may be applied to catalysts comprising the various catalytic metal oxides supported upon suitable carriers such as alumina, magnesia, silica gel, various clays, etc. In isoforming and similar processes catalysts of the clay type are usually employed. By clay-type catalysts is meant catalysts composed largely of clay-like and/or clay-forming materials such as alumina, silica, blends of alumina and silica, magnesia, bauxite, fuller's earth, and the like. These various catalysts may have such materials as $B_2O_3$, $AlF_3$, $ZrO_2$, etc., incorporated therein. They are, in general, the same as, or very similar to, the various catalysts of this type developed for catalytic cracking and are well known in the art.

I claim as my invention:

1. An improved process for the execution of endothermic reactions in the vapor phase with a finely divided solid regenerative catalyst at elevated temperatures which comprises heating and vaporizing a stream of organic vapors to be reacted, introducing into said stream freshly regenerated finely divided solid catalyst, introducing into said stream a heated mixture of partially spent finely divided solid catalyst and product gases, passing said stream into the lower portion of a fluidized column of finely divided solid catalyst under reaction conditions so that the vapors pass up through the fluidized catalyst, separating the vaporous reaction product into a gaseous and a liquid portion, withdrawing partially spent catalyst from said column, regenerating a portion of said withdrawn catalyst, and passing another portion of said withdrawn catalyst by means of said gaseous products through an indirect heating means wherein it is heated to a temperature above the reaction temperature prevailing in said catalyst column and then to the said incoming stream of vapors to be reacted.

2. An improved process for the execution of endothermic reactions in the vapor phase with a finely divided solid regenerative catalyst at elevated temperatures which comprises heating a stream of organic vapors to be reacted, introducing into said stream freshly regenerated finely divided solid catalyst, introducing into said stream a heated mixture of partially spent finely divided solid catalyst and product gases, passing said stream into the lower portion of a fluidized column of finely divided solid catalyst under reaction conditions so that the vapors pass up through the fluidized catalyst, separating the vaporous reaction product into a gaseous and a liquid portion, withdrawing partially spent catalyst from said column via a standpipe of such length that it serves as a vapor seal, regenerating a portion of said withdrawn catalyst, and passing another portion of said withdrawn catalyst by means of said gaseous products through an indirect heating means wherein it is heated to a temperature above the reaction temperature prevailing in said catalyst column and then to the said incoming stream of vapors to be reacted.

3. An improved process for the treatment of petroleum fractions in the vapor phase with a finely divided solid regenerative catalyst of the clay type under incipient cracking conditions which comprises heating and vaporizing a stream of petroleum hydrocarbons to be treated, introducing into said stream freshly regenerated finely divided solid catalyst of the clay type, introducing into said stream a heated mixture of partially spent catalyst and product gases, passing said stream into the lower portion of a fluidized column of said catalyst under incipient cracking conditions so that the vapors pass up through the fluidized catalyst, separating the vaporous reaction product into a gaseous and a liquid portion, withdrawing partially spent catalyst from said column, regenerating a portion of said withdrawn catalyst, and passing another portion of said withdrawn catalyst by means of said gaseous products through an indirect heating means wherein it is heated to a temperature above the reaction temperature prevailing in said catalyst column and then into the said incoming stream of vapors to be reacted.

4. An improved process for the cracking of hydrocarbon oils in the vapor phase with a finely divided solid regenerative cracking catalyst under cracking conditions which comprises heating and vaporizing a stream of oil to be cracked, introducing into said stream freshly regenerated finely divided solid cracking catalyst, introducing into said stream a heated mixture of partially spent finely divided solid cracking catalyst and product gases, passing said stream into the lower portion of a fluidized column of finely divided solid cracking catalyst under cracking conditions so that the vapors pass up through the fluidized catalyst, separating the vaporous reaction product into a gaseous and a liquid portion, withdrawing partially spent catalyst from said column, regenerating a portion of said withdrawn catalyst, and passing another portion of said withdrawn catalyst by means of said gaseous products through an indirect heating means wherein it is heated to a temperature above the reaction temperature prevailing in said catalyst column and then to the said incoming stream of vapors to be reacted.

GEORGE E. LIEDHOLM.